UNITED STATES PATENT OFFICE.

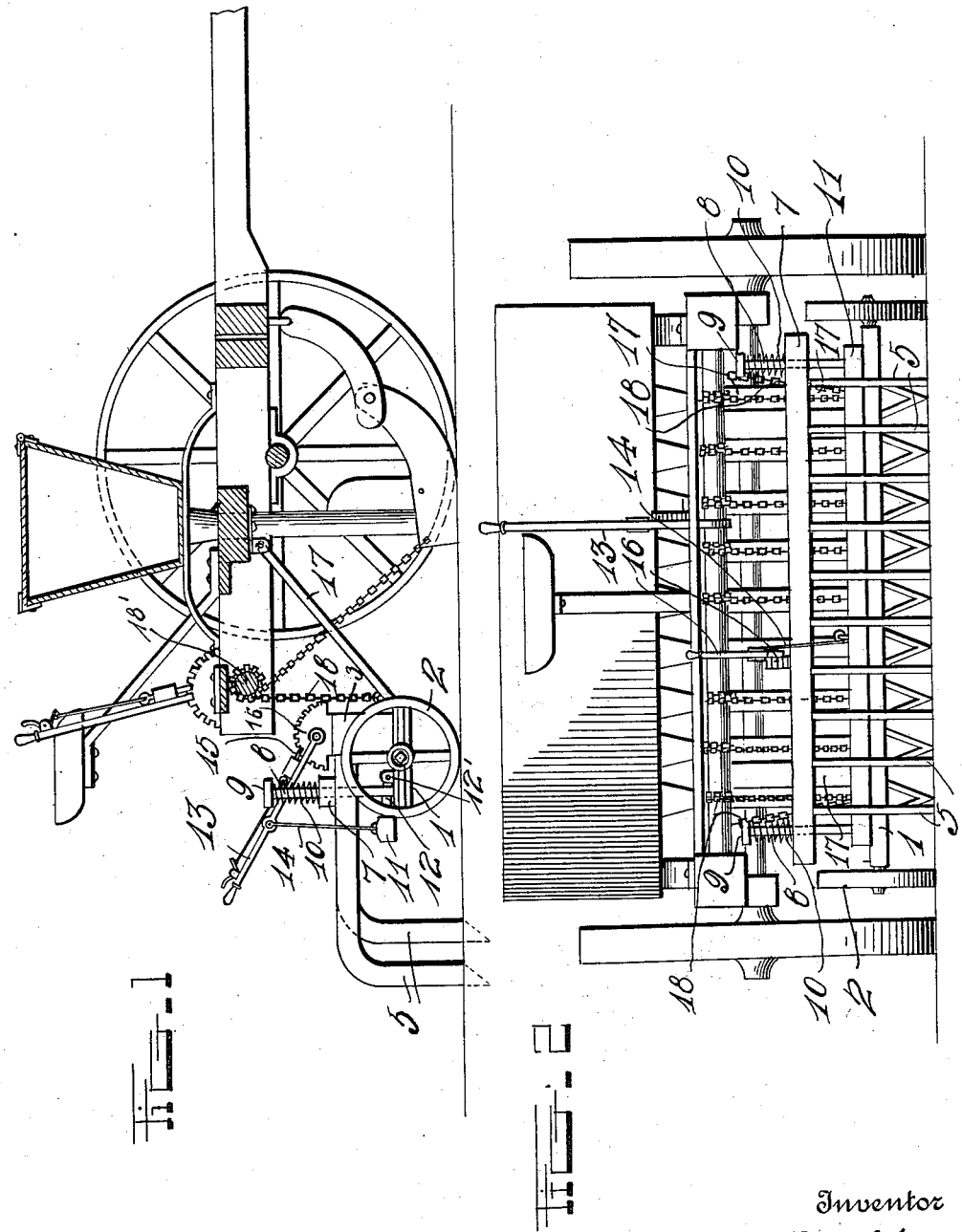

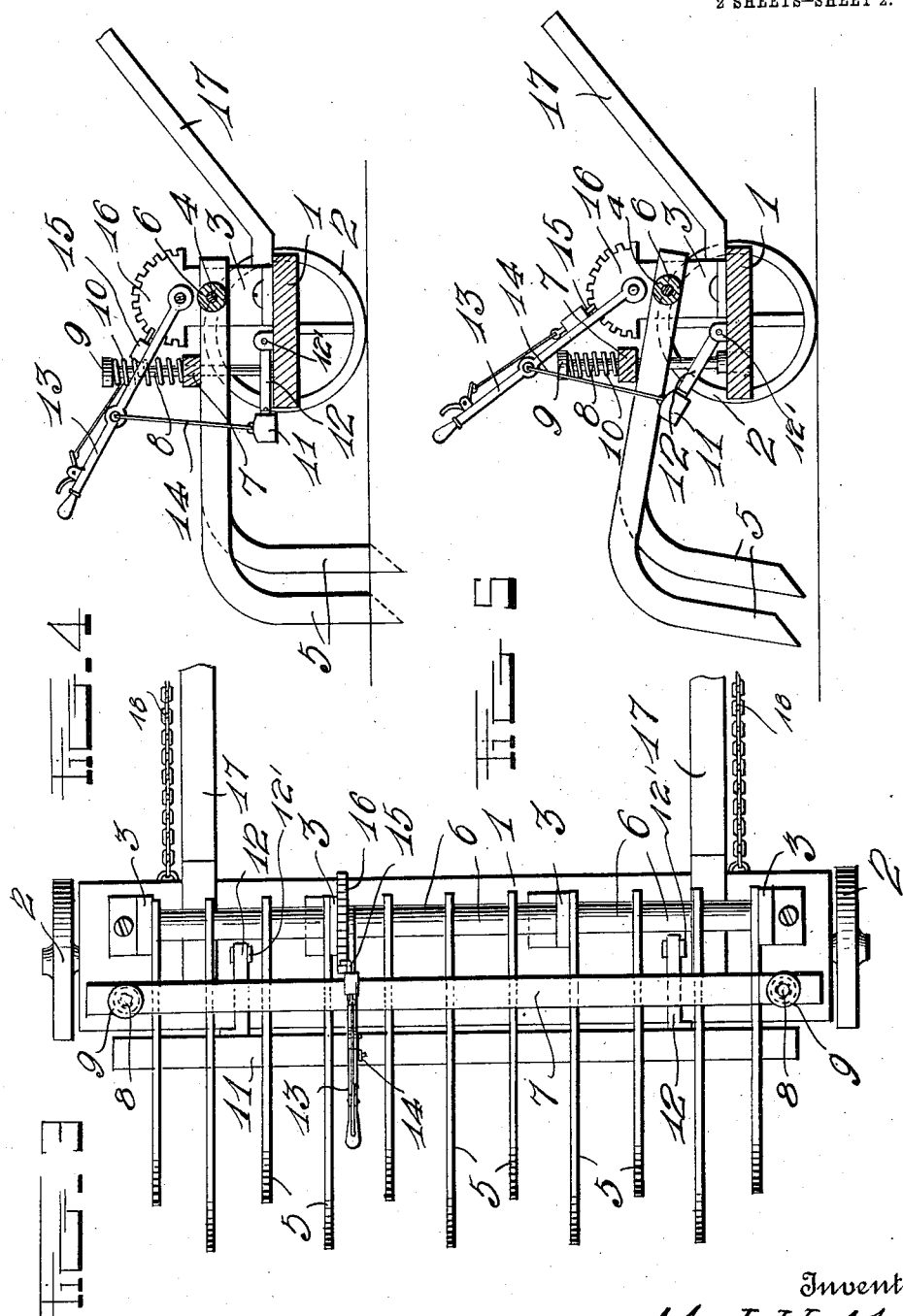

MARSHALL J. HILL, OF ST. JOSEPH, WISCONSIN.

DRAG.

1,031,553.  Specification of Letters Patent.  Patented July 2, 1912.

Application filed September 8, 1910. Serial No. 580,959.

*To all whom it may concern:*

Be it known that I, MARSHALL J. HILL, a subject of the King of England, but having declared my intention of becoming a citizen of the United States, residing at St. Joseph, in the county of St. Croix and State of Wisconsin, have invented certain new and useful Improvements in Drags; and I do declare the following to be a full, clear, and exact description of the invention, such as will enable others skilled in the art to which it appertains to make and use the same.

This invention relates to improvements in drags.

One object of the invention is to provide a drag adapted to be attached to any kind of a drill or broadcast seeding machine whereby the seed will be effectually covered.

Another object is to provide a drag of this character having independently pivoted teeth which are adapted to swing up when brought into engagement with obstacles, thereby preventing the breaking or bending of the teeth and having means whereby the teeth are yieldingly held down in operative position.

A further object is to provide means whereby the teeth may be simultaneously raised when desired.

With the foregoing and other objects in view, the invention consists in certain novel features of construction, combination and arrangement of parts as will be more fully described and claimed.

In the accompanying drawings; Figure 1 is a side view of a drag constructed in accordance with the invention showing the same attached to a drill; Fig. 2 is a rear view of the same; Fig. 3 is a plan view of the drag; Fig. 4 is a vertical longitudinal sectional view thereof; Fig. 5 is a similar view showing the teeth in raised position.

In the embodiment of the invention I provide a tooth supporting board 1 which may be engaged directly with the ground when drawn over the same or which may be provided on its opposite ends with suitable supporting shoes or as shown in the drawings said board may be supported upon small wheels 2 which are revolubly mounted on the opposite ends thereof. On the board 1 near the forward edge thereof is arranged a series of shaft supporting lugs 3 of which there may be any suitable number, said lugs being arranged at suitable intervals as shown. In the lugs 3 is mounted a tooth carrying rod or shaft 4 on which is pivotally mounted a series of rearwardly projecting L-shaped drag teeth 5, the free ends of the long arms of said teeth being pivotally connected with and spaced apart on the rod or shaft 4 by a series of spacing sleeves 6. The teeth 5 are preferably of different lengths, the shorter teeth being arranged alternately or between the longer teeth as shown. The teeth 5 project a suitable distance beyond the rear edge of the board 1 and are held down in yielding engagement with the ground by a pressure bar 7 which is loosely engaged near its opposite ends with guide pins 8 having on their upper end suitable heads 9 between which and the bar 7 are arranged coiled springs 10 the pressure of which is exerted on the bar 7 to cause the latter to hold the teeth down in the manner described. By thus holding the teeth any of the same, if brought into engagement with an obstruction of any kind will be permitted to spring upwardly thus preventing the tooth from being broken and whereupon after the obstruction has been passed the tooth will be again forced down to an operative position.

Beyond the outer edge of the board 1 is arranged a teeth lifting bar 11, said bar being hinged to the board 1 by rigid arms 12, extending laterally from the inner front edge of said bar and pivotally connected at their free ends to apertured ears or lugs 12' projecting upwardly from the board 1 preferably at points midway the width thereof. These arms afford an extended leverage for the bar 7 when it is raised to lift the teeth 5 under which said bar extends and when said bar is swung upwardly all of the teeth will be raised to the desired elevation. In order to swing the board 11 upwardly and thus raise the teeth, I provide a suitable lifting lever 13, which is pivotally mounted on the board 1 in any suitable manner and is connected by an operating rod 14 to the bar 11 as shown. The lever 13 is provided with a locking pawl 15 adapted to be engaged with the teeth of a segmental rack 16 whereby when the bar 11 has been swung upwardly to raise the teeth to the desired elevation, said lever will be locked, thus holding up the teeth until it is again desired to lower them.

The drag is provided with forwardly projecting attaching bars 17 which are adapted to be pivotally secured to the frame of a drill or seeding machine whereby the drag will be drawn along behind the same for the purpose of effectually covering the seeds discharged from the machine. The drag is also provided with supporting chains 18 which are adapted to be attached at their upper ends to the drill raising shaft 18' of the machine whereby when said shaft is operated to raise the drills the chains will be wound thereby simultaneously raising the drag.

From the foregoing description taken in connection with the accompanying drawings, the construction and operation of the invention will be readily understood without requiring a more extended explanation.

Having thus described my invention, what I claim is:

The combination with a seeding machine, of a drag movably attached thereto, said drag comprising a supporting transversely disposed board, mounted on wheels, shaft supporting lugs projecting upwardly from said board, a toothed segment forming the upper end of one of the lugs, a shaft mounted in said lugs, a plurality of drag teeth independently mounted on said shaft, guide pins projecting upwardly from the supporting board and located adjacent the opposite ends thereof, heads forming the upper ends of said pins, a bar contacting with the upper edges of the drag teeth and slidably engaged therewith, coiled springs encircling the pins and disposed between the headed ends of the same and the bar, a lifting bar hingedly attached to the board and adapted for contact with the lower edges of the drag teeth, and means connected to the lifting bar and engaging with the toothed segment for holding the drag teeth in an adjusted position.

In testimony whereof I have hereunto set my hand in presence of two subscribing witnesses.

MARSHALL J. HILL.

Witnesses:
 L. B. CASTLE,
 F. B. CASTLE.